(12) United States Patent
Eisenhauer

(10) Patent No.: US 6,501,068 B1
(45) Date of Patent: Dec. 31, 2002

(54) METHOD FOR MANUFACTURE OF OPTICAL TORQUE TRANSDUCERS

(75) Inventor: Karl Yarnos Eisenhauer, Glen forrest (AU)

(73) Assignee: Bishop Innovation Limited, North Ryde (AU)

( * ) Notice: Subject to any disclaimer, the term of this patent is extended or adjusted under 35 U.S.C. 154(b) by 0 days.

(21) Appl. No.: 09/509,536

(22) PCT Filed: Oct. 15, 1998

(86) PCT No.: PCT/AU98/00857

§ 371 (c)(1),
(2), (4) Date: Apr. 7, 2000

(87) PCT Pub. No.: WO99/20427

PCT Pub. Date: Apr. 29, 1999

(30) Foreign Application Priority Data

Oct. 17, 1997 (AU) ............................................ PO 9848
Dec. 17, 1997 (AU) ............................................ PP 0983
May 6, 1998 (AU) ............................................ PP 3377

(51) Int. Cl.⁷ ................................................ H01J 40/00
(52) U.S. Cl. ............................ 250/231.14; 250/492.1; 250/231.16
(58) Field of Search ................... 250/231.14, 237 G, 250/231.16

(56) References Cited

U.S. PATENT DOCUMENTS 4,406,939 A  9/1983  Golker
5,057,685 A  10/1991  Kurosawa et al.
5,474,813 A * 12/1995  Walker et al. ............... 427/510

OTHER PUBLICATIONS

Patent Abstracts of Japan, JP 10–019695 A, Jun. 16, 1995.
Patent Abstracts of Japan, P 1579, p. 24, JP 5–72064A.

* cited by examiner

Primary Examiner—John R. Lee
Assistant Examiner—Anthony Quash
(74) Attorney, Agent, or Firm—Arent Fox Kintner Plotkin & Kahn PLC

(57) ABSTRACT

A method of manufacturing patterns on the surfaces of grating elements of a torque transducer having a shaft comprising first and second rigid torque input members connected by a torsional coupling enabling relative angular deflection between the first and second input members, first and second grating elements respectively associated with the first and second input members, the surfaces of the grating elements being adjacent to each other and able to relatively displace as a function of torque in the shaft, the method comprising the steps of: forming an assembly by rotationally and axially fixing the input members and respective grating elements to the torsional coupling; mounting the assembly in a machine comprising a radiation source arranged to irradiate regions of the surfaces of the grating elements while a relative angular displacement between the torque input members with respect to their zero torque alignment condition is maintained; and simultaneously irradiating regions of the surfaces of the grating elements while the angular displacement between the torque input members is maintained.

26 Claims, 10 Drawing Sheets

2

METHOD FOR MANUFACTURE OF OPTICAL TORQUE TRANSDUCERS

This invention relates to a method for manufacture of optical torque transducers. Such torque transducers are used for measuring the magnitude of torque in shafts, in particular rotating shafts such as found in electric power steering systems in vehicle applications.

BACKGROUND

Electric power steering systems conventionally incorporate an input shaft element, connected via a Hooke's joint arrangement and intermediate shaft to the steering wheel. The input shaft therefore needs to rotate through an angle typically one to two revolutions either side of the on-centre steering position. It is a requirement of the electric power steering system to accurately measure the continuously varying torque in this rotating shaft. Conventionally torque applied to the shaft causes it to angularly deflect, such deflection causing one part of the shaft to angularly displace with respect to another part, and this displacement may be sensed to provide a measurement of this torque.

The sensing means needs to allow for rotation of the shaft, preferably employing non-contact signal transmission means for reliability or simplicity. Said sensing means includes aperture based and reflective optical devices and magnetic devices such as magnetostrictive or variable reluctance couplings.

To improve the accuracy of such sensing means the torque transducer may incorporate a shaft assembly which comprises two grating elements attached to or integral with two torque input members joined by a torsionally compliant coupling. When torque is applied between the two torque input members the torsionally compliant coupling deflects causing an increased relative angular displacement of the two grating elements that allows the use of less sensitive sensing means.

This method relates to the manufacture of torque transducers that use reflective or transmissive optical sensing means, which comprise grating patterns consisting of alternating regions of high and low reflectivity or transmissibility (respectively) for a given incident electromagnetic radiation (EMR). High and low reflectivity includes variations in direct, specular reflection and variations in diffuse reflection. The grating patterns are illuminated by a source of EMR, typically UV, visible or IR light, which are interrogated by one or more arrays of detectors sensitive to the EMR. Arrays include Charge Couple Devices (CCD), Very Large Scale Integration (VLSI) vision chips and one or two-dimensional photodetector arrays. The output of the one or more arrays interrogating the patterns can be processed to produce a measure of the torque applied to the shaft.

The regions of high and low reflectivity or transmissibility can be arranged axially or radially about the axis of rotation of the shaft, and are of such a nature that allows a continuous output of the arrays regardless of the angular position of the shaft, as the array dimensions may not allow the complete circumference or radial face to be viewed by the arrays at any instant in time.

The prior art which is most closely related to that of the present invention is described in U.S. Pat. No. 4,406,939 (Golker) entitled "Method for the Manufacture of a Code Disk for Optical Incremental Shaft Encoders and Absolute Shaft Encoders" which shows the use of laser techniques for manufacturing of shaft encoder patterns.

The essence of the present method resides in the application of radiation, and particularly optical laser radiation, patterning techniques simultaneously to two mutually adjacent grating elements of a shaft assembly. The shaft assembly is assembled prior to irradiation, and comprises the two grating elements attached to or integral with two torque input members that are connected by a torsionally compliant coupling. The simultaneous irradiation of the two grating elements of the shaft assembly provides very accurate control of the relative disposition of the two grating patterns thus generated for the zero torque alignment condition. Further, since the grating patterns are mutually adjacent, a single radiation source can be used for both patterns with further improvement of pattern disposition. This contrasts to the use of optical patterning methods as disclosed in the aforementioned prior art which, if employed, would require the independent "prepatterning" of two grating elements (referred to as "code disks") prior to assembly of the shaft, with subsequent introduction of inaccuracies in the relative disposition of the two grating patterns during the subsequent assembly operation.

Radiation in the present specification includes optical electromagnetic radiation with wavelengths in vacuum between 40 nm and 1 mm, as defined by The International Society for Optical Engineering.

The advantages of a method according to the present invention to construct a "reflective grating" torque transducer (as disclosed in co-pending International Patent Application No. PCT/AU98/00645) or a "transmissive grating" torque transducer (as disclosed in co-pending Australian Provisional Patent Application No. PP0984 filed Dec. 17, 1997 entitled "Transmission Path Torque Transducer") accrue from the generation of the patterns after assembly of the shaft. This means that the relative dispositions of the two patterns are determined with great accuracy, which is not disturbed by subsequent assembly operations as would be the case if the patterns were generated prior to assembly of the shaft.

Firstly, calibration of the finished transducer is not required thus saving cost and time in manufacture.

Secondly, the shafts can be interchanged without recalibration or accurate assembly methods, and the arrays are likewise interchangeable without recalibration or accurate assembly methods.

Thirdly, the transducer can be disassembled and reassembled if required for maintenance or repair purposes without the need for special tools or accurate assembly methods.

Fourthly, the "locked in" nature of the relative pattern dispositions means that adjustment features such as screws and stops are not required, which therefore eliminates the possibility that the transducer can be inadvertently miscalibrated by the user or untrained repair personnel.

Fifthly, the use of irradiation allows patterns to be generated on the grating elements with great accuracy and speed.

Finally, the use of irradiation allows complex and angularly non-repetitive patterns, such as barcodes, to be flexibly generated, for example by manipulation of a laser. This allows the torque transducer shaft to be of simpler construction as "aliasing" problems can be eliminated as the individual marks (or groups of regions of high and low reflectivity or transmissibility) have a unique, coded identity. Aliasing is defined in this application as the situation where sufficient angular deflection occurs between the two grating elements that the disposition of the respective patterns is identical to their disposition for a lesser magnitude of angular deflection, thereby yielding indeterminancy and potentially a false measurement of torque in the shaft. Barcodes provide an absolute indication of which mark is being viewed by the array hence eliminate indeterminacy caused by aliasing. Marks in the form of barcoded patterns also allow easy determination of absolute shaft angular position, providing additional functionality of the transducer, or elimination of the need for external angle encoders.

SUMMARY OF INVENTION

The present invention consists in a method of manufacturing grating patterns on the surfaces of grating elements of a torque transducer, the torque transducer comprising a shaft with a longitudinal axis, the shaft comprising first and second substantially rigid torque input members which are connected by a torsionally compliant coupling, the coupling thereby enabling angular deflection of the first torque input member relative to the second torque input member as a function of the magnitude of the torque in the shaft, a first grating element attached to or integral with the first torque input member and a second grating element attached to or integral with the second torque input member, the surfaces of the two grating elements being adjacent and able to relatively displace as a function of torque in the shaft, the method comprising the steps of:

a first step of forming an assembly by rotationally and axially fixing the first and second torque input members and respective grating elements to the torsionally compliant coupling; a second step of mounting the assembly in a machine comprising a radiation source arranged to irradiate regions of the adjacent surfaces of the two grating elements whilst a predetermined relative angular displacement between the two torque input members with respect to their zero torque alignment condition is maintained; and a third step of simultaneously irradiating regions of the adjacent surfaces of the two grating elements whilst the predetermined angular displacement between the two torque input members is maintained; thereby generating grating patterns on the surfaces of the two grating elements of the assembly which are precisely mutually aligned for this zero torque alignment condition.

In a first embodiment it is preferred that the machine provides mounting for rotation of the assembly about the longitudinal axis of the shaft and the third step further comprises rotating the assembly and successively irradiating regions of the adjacent surfaces at predetermined angular rotational positions of the assembly.

It is preferred that the assembly rotates through substantially one revolution during the successive rotations.

It is preferred that the assembly is rotationally stationary during at least one of the successive irradiations.

Alternatively it is preferred that the assembly is rotating during at least one of the successive irradiations.

In a second embodiment it is preferred that the assembly is mounted stationary in the machine during the third step.

It is preferred that the surface of at least one of the first or second grating elements is substantially cylindrical, with its central axis collinear with the longitudinal axis of the shaft.

Alternatively it is preferred that the surface of at least one of the first or second grating elements is substantially planar and radially disposed with respect to the longitudinal axis of the shaft.

Still alternatively, it is preferred that the surface of at least one of the first or second grating elements is substantially conical, with its central axis collinear with the longitudinal axis of the shaft.

Still alternatively, it is preferred that the surface of at least one of the first or second grating elements is substantially axis-symmetric, with its central axis collinear with the longitudinal axis of the shaft.

It is preferred that each grating pattern comprises alternating regions of high and low reflectivity or transmissibility for a given incident electromagnetic radiation.

It is preferred that a radiation-opaque mask is interposed between the radiation source and the surfaces of the grating elements and the geometry of the mask determines the shape and disposition of the patterns.

Alternatively the radiation source comprises a laser that irradiates the surfaces of the grating elements and the shape and disposition of the patterns are determined by controlling the laser beam focus and/or impingement position on the grating elements.

Alternatively the radiation source comprises a laser that irradiates the surfaces of the grating elements and the shape and disposition of the patterns are determined by controlling the relative positions of the grating elements and the laser.

It is preferred that the predetermined relative angular displacement maintained between the two torque input members is substantially zero.

It is preferred that the grating pattern on at least one of the grating elements is arranged in the form of a bar code or a succession of bar codes.

It is preferred that the irradiation removes material or changes the physical or chemical properties of regions of the adjacent surfaces of the grating elements, thereby increasing or decreasing the reflectivity or transmissibility of these regions.

Alternatively a layer of polymer such as polyimide is applied to the adjacent surfaces of the grating elements prior to irradiation, and the irradiation removes this layer from regions of the grating elements, thereby exposing the original surface of the grating elements, this being of increased or decreased reflectivity or transmissibility compared to the surface of the polymer layer.

Alternatively a layer of inorganic material such as alumina ceramic is applied to the adjacent surfaces of the grating elements prior to irradiation, and the irradiation removes this layer from regions of the grating elements, thereby exposing the original surface of the grating elements, this being of increased or decreased reflectivity or transmissibility compared to the surface of the inorganic layer.

Alternatively a layer of metallic material such as electroplated copper is applied to the adjacent surfaces of the grating elements prior to irradiation, and the irradiation removes this layer from regions of the grating elements, thereby exposing the original surface of the grating elements, this being of increased or decreased reflectivity or transmissibility compared to the surface of the metallic layer.

Alternatively the surfaces comprise a proportion of titanium dioxide and the change in chemical properties is effected by changing the titanium dioxide to titanium oxide.

Alternatively the surfaces comprise a proportion of aluminium oxide, and the change in chemical properties is effected by reduction of aluminium oxide to aluminium.

Alternatively the irradiation cures regions of a layer of uncured polymer applied to the adjacent surfaces of the grating elements prior to irradiation, the surfaces of these regions being of increased or decreased reflectivity or transmissibility compared to the original surface of the grating elements which are subsequently exposed by removal of the remaining uncured polymer after irradiation.

It is preferred that the assembly is subjected to turning, grinding, roller burnishing, honing or other processes to improve the relative cylindricity or concentricity of the surface of the at least one substantially cylindrical grating element or, alternatively, to improve the relative flatness or planarity of the surface of the at least one substantially planar and radially disposed grating element or, still alternatively, to improve the relative conicity or concentricity of the surface of the at least one substantially conical grating element, before the grating pattern is generated.

BRIEF DESCRIPTION OF DRAWINGS

The present method will now be described by way of a non-limiting example with reference to the accompanying drawings, in which.

MODE OF CARRYING OUT INVENTION

Figure 1:
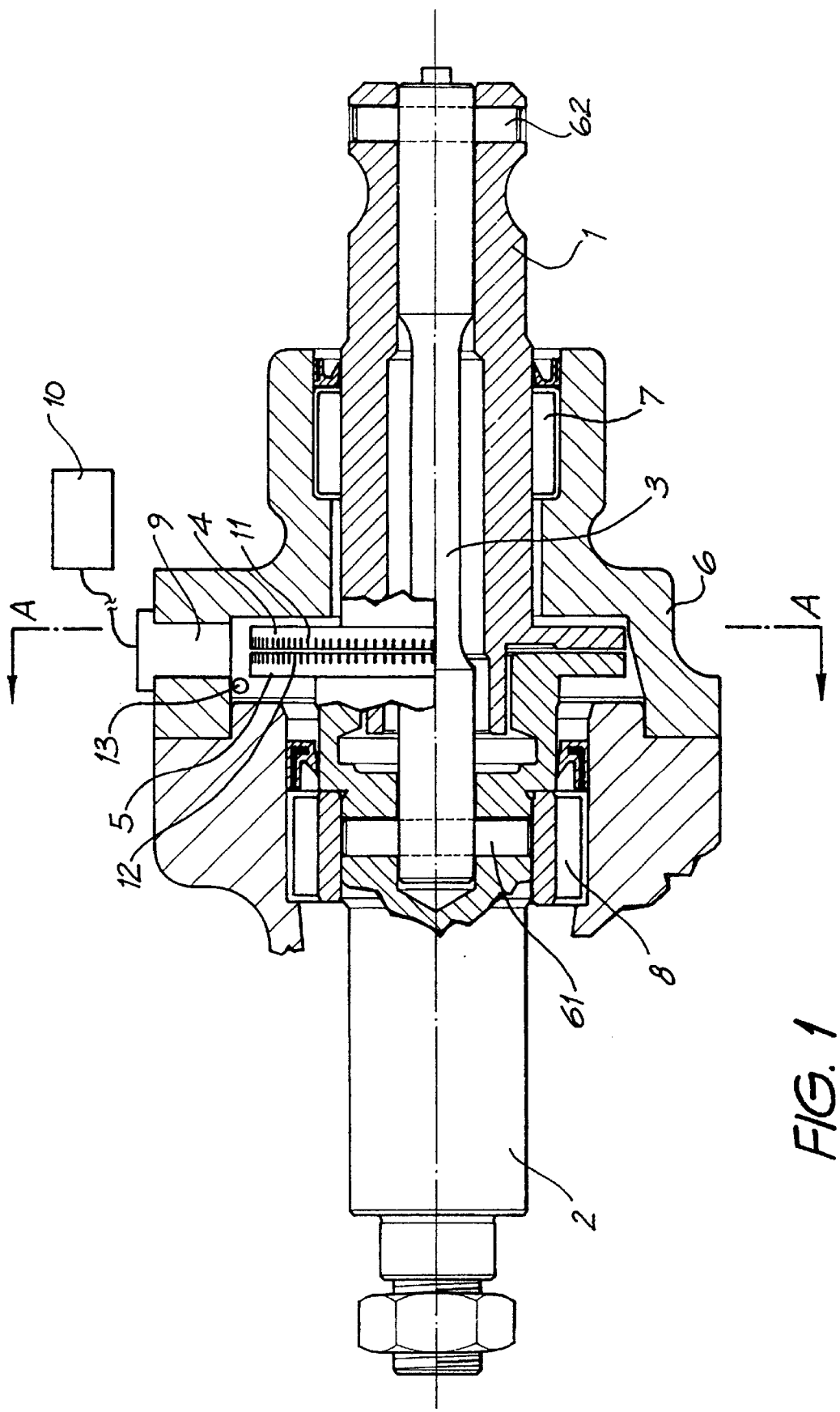
FIG. 1 is a cross sectional view of a "reflective grating" torque transducer manufactured by a method according to a first embodiment of the present invention, showing the shaft assembly comprising two torque input members connected by a torsion bar, two grating elements with grating patterns and associated arrays and EMR source.

FIG. 1 is a cross section of a "reflective grating" torque transducer manufactured by a method according to a first embodiment of the present invention showing a shaft assembly comprising cylindrical grating elements 4 and 5 attached to or integral with torque input members 1 and 2. Torque input members 1 and 2 are rotationally and axially fixed to either end of a torsionally compliant coupling in the form of torsion bar 3, via cross pins 61 and 62. Grating elements 4 and 5 comprise cylindrical peripheral surfaces composed of alternating regions of high and low reflectivity, provided by grating patterns 11 and 12 respectively. This assembly is enclosed in housing 6 and supported by bearings 7 and 8. One or more electromagnetic radiation (EMR) sources 13 are disposed to illuminate the surfaces in the vicinity of array 9. Array 9, comprising one or more EMR sensitive detectors receives incident EMR from the surfaces and the images thus generated on array 9 are processed by processor 10. The methods by which the images are processed are well known in the art of image analysis, and some of these methods used are described in "VISION CHIPS: Implementing Vision Algorithms with Analog VLSI Circuits", by Christof Koch and Hua Li, IEEE Computer Society Press, ISBN 0-8186-6492-4. A suitable array may be constructed from two linear photodetector arrays such as device TSL1410 manufactured by Texas Instruments Inc.

Figure 2:
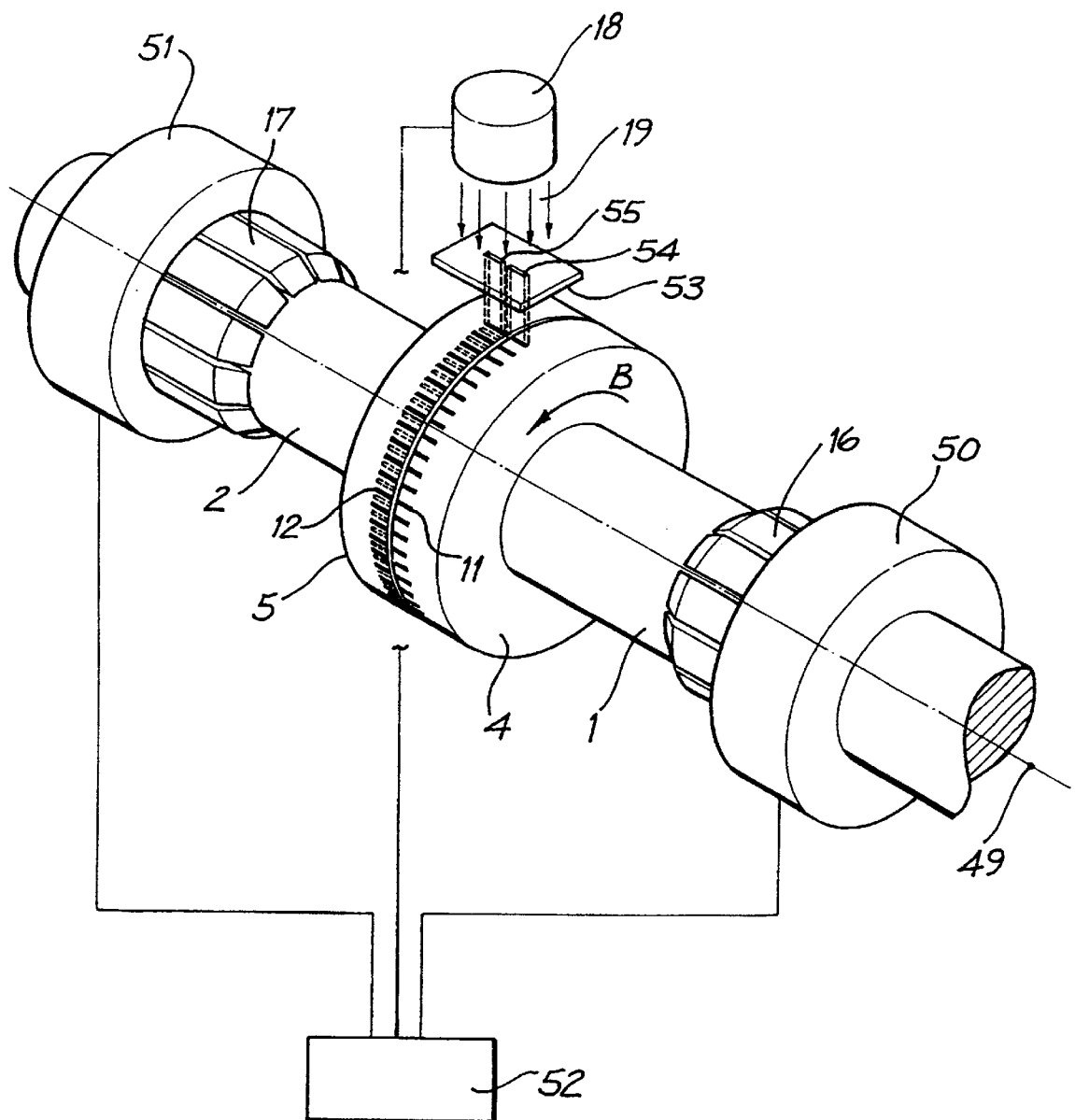
FIG. 2 is an isometric view of the shaft assembly shown in FIG. 1, being rotated about its axis with a radiation source generating grating patterns on the grating elements (with the predetermined relative angular displacement between the two torque input members being non-zero) according to a first embodiment of the present invention.

FIGS. 2 and 3 show a method of manufacture of the shaft assembly of the torque transducer shown in FIG. 1 according to a first embodiment of the present invention. FIG. 2 is an isometric view of the shaft assembly, showing cylindrical grating elements 4 and 5 attached to or integral with torque input members 1 and 2, in turn rotationally and axially fixed to either end of torsion bar 3. The shaft assembly is gripped at either end by collets 16 and 17 of drive assemblies 50 and 51 respectively. Each of the drive assemblies 50 and 51 comprise a hollow armature servo motor and angle encoder connected to controller 52, and are supported to rotate on axis 49 in the frame of a machine structure (not shown). Controller 52 receives angular position inputs from the encoders of each of the drive assemblies 50 and 51 and generates appropriate control signals for the respective servo motors, thus achieving a predetermined sequence of rotational motion for the shaft assembly. Sufficient torque is applied by the drive assemblies 50 and 51 to maintain, by closed loop control, a predetermined, fixed relative angular displacement of torque input members 1 and 2 (and hence therefore also grating elements 4 and 5) that is maintained throughout the patterning process. Radiation source 18 provides diffuse irradiation 19 to the cylindrical peripheral surfaces of grating elements 4 and 5 through mask 53 comprising apertures 54 and 55. Radiation source 18 is also controlled by controller 52. The location of drive assemblies 50 and 51, radiation source 18 and mask 53 are accurately determined relative to the shaft assembly by the machine structure (not shown).

Drive assemblies 50 and 51 are arranged to rotate the shaft assembly about shaft assembly axis 49 with a predetermined sequence of angular motion, whereby the shaft assembly is stationary at a predetermined angular position during application of irradiation 19 as directed by controller 52, then rotates in direction B with a predetermined angular velocity and acceleration profile to the next predetermined angular position and stops prior to the next application of irradiation 19. The irradiation thus generates grating patterns 11 and 12 comprising alternating regions of high and low reflectivity for the given EMR source (13 in FIG. 1), on the surfaces of grating elements 4 and 5 comprising sequentially generated individual subpatterns 11a,b,c,d,e . . . and 12a,b,c,d,e . . . respectively (refer to FIG. 3a). Upon completion of the patterning process the drive assemblies 50 and 51 cease to apply torque to the shaft assembly, thus allowing the torsion bar 3 to relax and restore the relative angular displacement of torque input members 1 and 2 (and hence therefore also grating elements 4 and 5) to zero. The final undeflected relative disposition of the grating patterns may be, for example, as shown as dotted for grating element 5, with grating pattern 11 interposed between grating pattern 12.

Figure 3A:
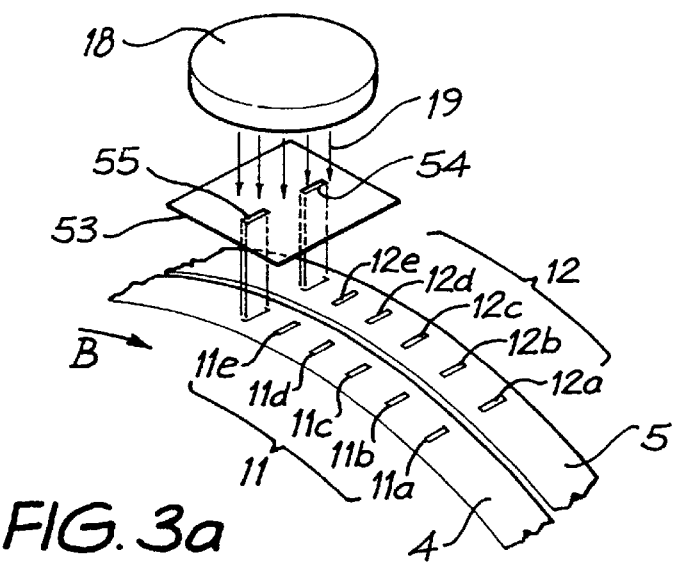
FIGS. 3a–c show alternative methods of irradiating the surfaces of the grating elements.
Figure 3B:
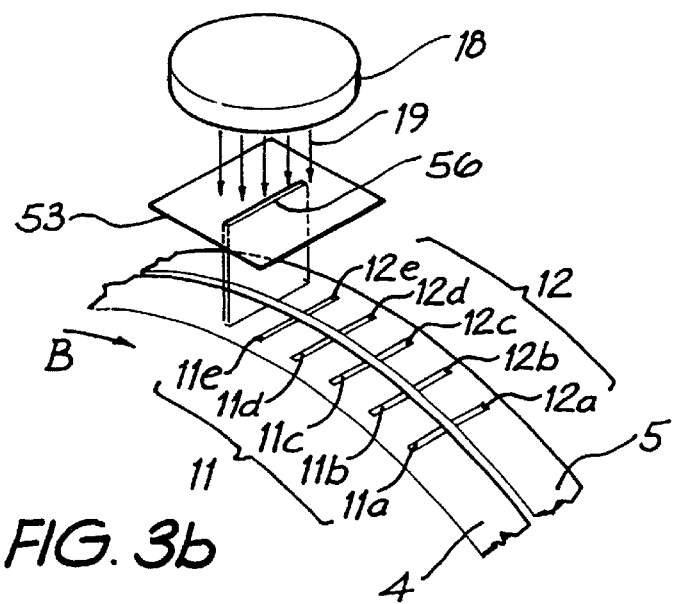
Figure 3C:
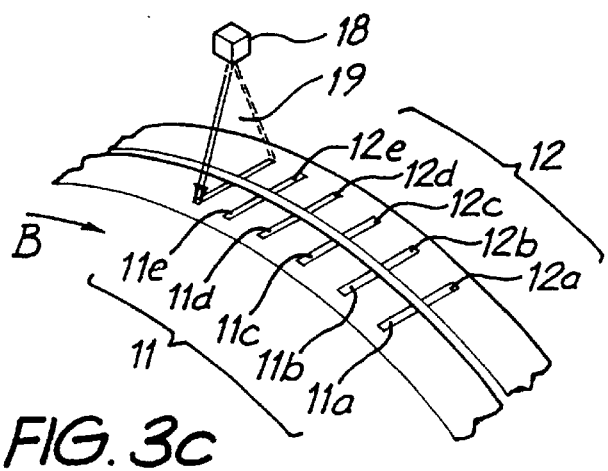

FIGS. 3b and 3c shows some alternative grating pattern generating arrangements applicable to the manufacturing method according to the first embodiment of the present invention. FIG. 3b shows diffuse irradiation 19 directed by single aperture 56 in mask 53 which creates grating patterns 11 and 12 on grating elements 4 and 5 which extend all the way to their mutual interface. FIG. 3c shows radiation source 18 providing narrow beam irradiation 19 directly to the grating elements 4 and 5 without the use of a mask. The irradiation is "steered" by the use of mirrors capable of deflection, controlled by signals from the controller 52. Such an arrangement can be used to produce grating patterns as illustrated in FIG. 3a with suitable on-off modulation of irradiation 19 in co-ordination with the deflection of the mirrors.

Figure 4:
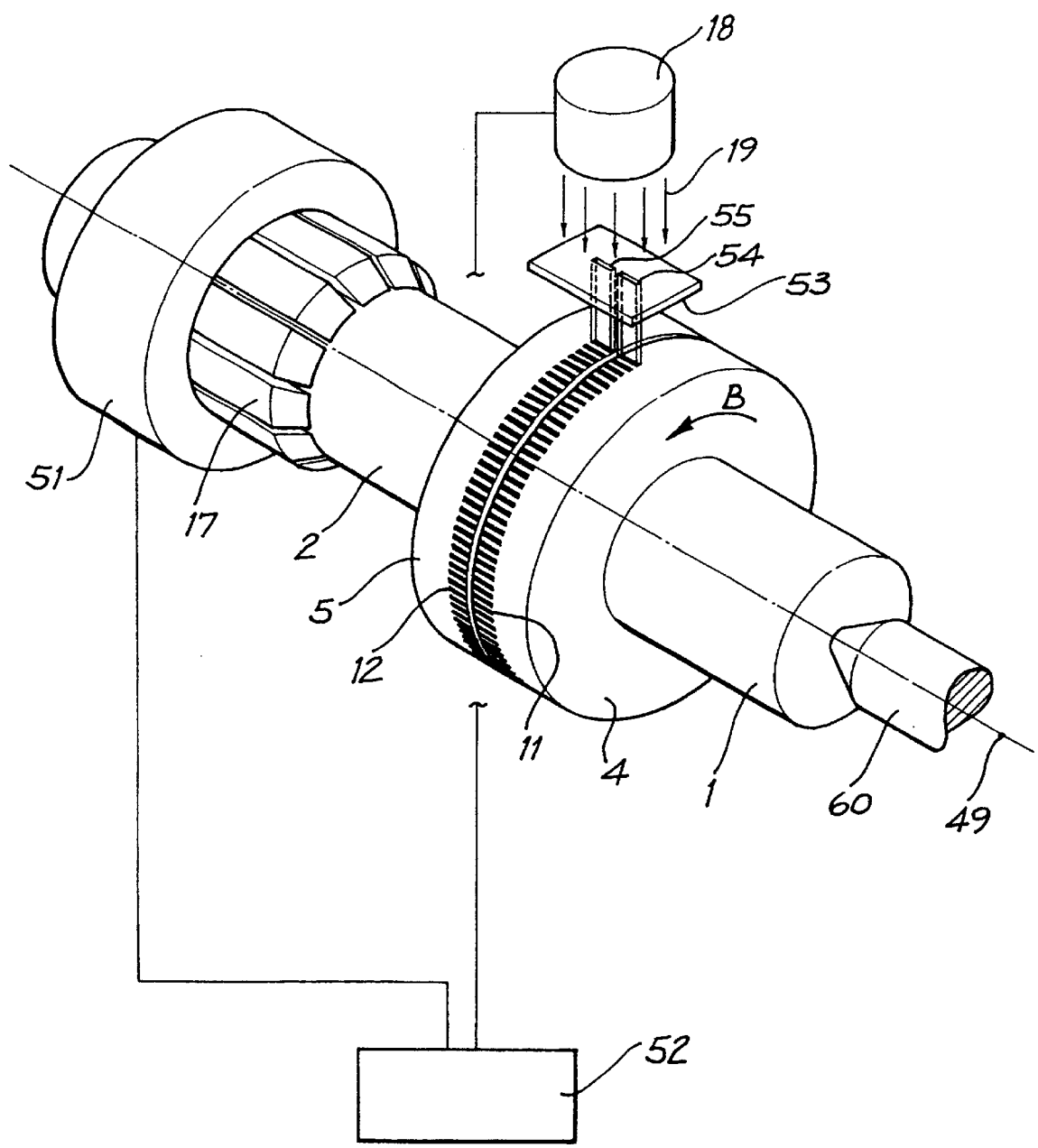
FIG. 4 is an isometric view of the shaft assembly shown in FIG. 1, being rotated about its axis with a radiation source generating grating patterns on the grating elements (with the predetermined relative angular displacement between the two torque input members being substantially zero) according to a first embodiment of the present invention.

FIG. 4 shows an alternative method of manufacture of the shaft assembly of the torque transducer according to the first embodiment of the present invention, being an isometric view of the shaft assembly, showing cylindrical grating elements 4 and 5 attached to or integral with torque input members 1 and 2, in turn rotationally and axially fixed to either end of torsion bar 3. One end of the shaft assembly is gripped by collet 17 of drive assembly 51, comprising a hollow armature servo motor and angle encoder connected to controller 52, and the other end is supported in live centre 60. Both drive assembly 51 and centre 60 is supported by the frame of a machine structure (not shown). Controller 52 receives an angular position input from the encoder of drive assembly 51 and generates the appropriate control signal for the servo motor to achieve a predetermined sequence of rotational motion for the shaft assembly. Radiation source 18 provides diffuse irradiation 19 to the cylindrical surfaces of grating elements 4 and 5 through mask 53 comprising apertures 54 and 55. Radiation source 18 is also controlled by controller 52. The location of drive assembly 51, centre 60, radiation source 18 and mask 53 are accurately determined relative to the shaft assembly by the machine structure (not shown). Drive assembly 5 is arranged to rotate the shaft assembly about shaft assembly axis 49 with a predetermined sequence of angular motion, whereby the shaft assembly is stationary at a predetermined angular position during application of irradiation 19 as directed by controller 52, then rotates in direction B with a predetermined angular velocity and acceleration profile to the next predetermined angular position and stops prior to the next application of irradiation 19. The irradiation thus generates grating patterns 11 and 12 comprising alternating regions of high and low reflectivity for the given EMR source (13 in FIG. 1), on the surfaces of grating elements 4 and 5 comprising sequentially generated individual subpatterns 11a,b,c,d,e . . . and 12a,b, c,d,e . . . respectively (refer to FIG. 3a). The centre 60 is of sufficiently low rotational friction that the relative angular displacement of the grating patterns 11 and 12 from the undeflected (ie. zero torque) state during the patterning process is substantially zero and hence will not adversely affect the functioning of the torque transducer.

Figure 5:
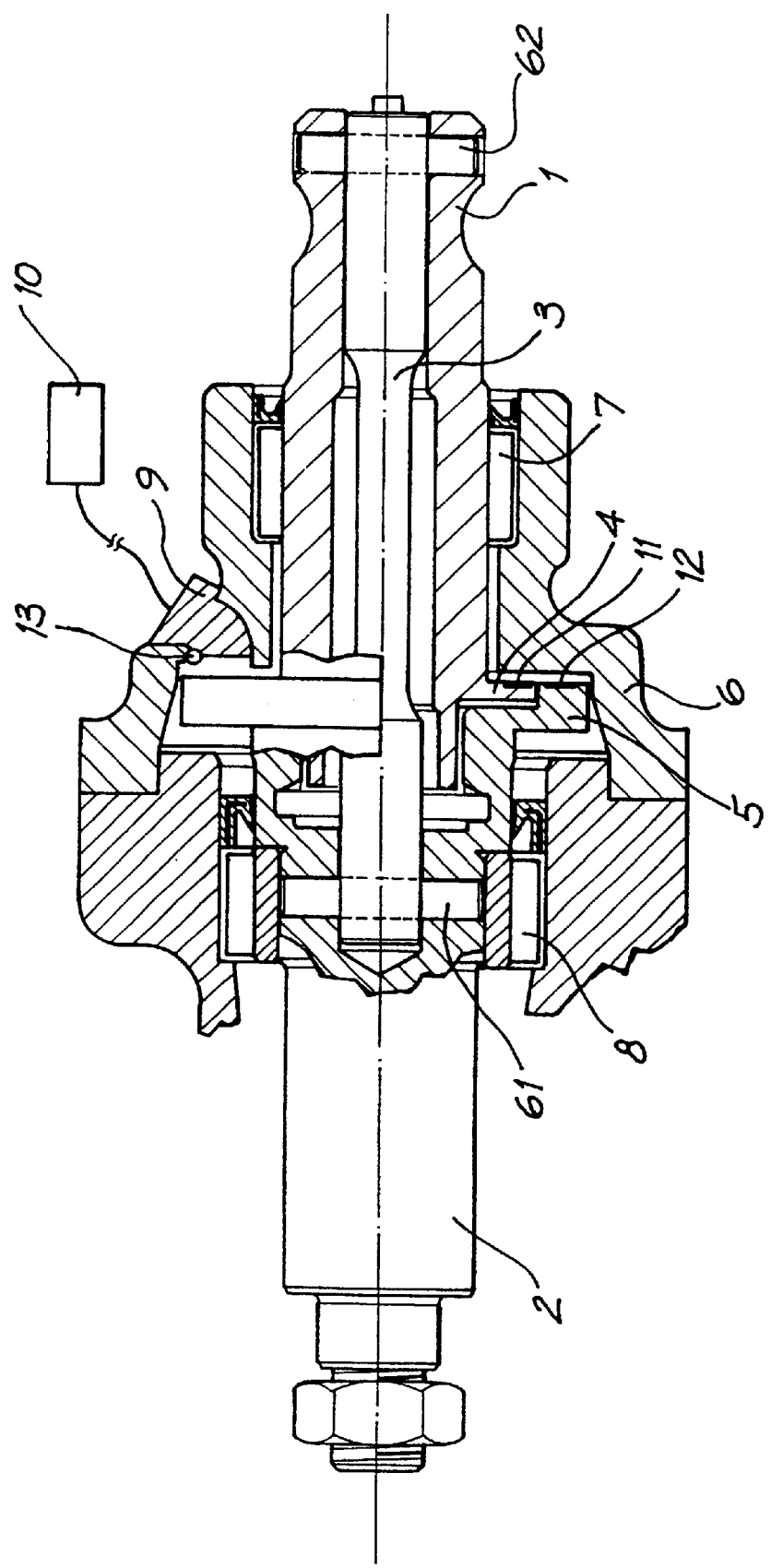
FIG. 5 is a cross sectional view of a "reflective grating" torque transducer, where the grating elements are planar and radially disposed with respect to the shaft axis.

FIG. 5 is a cross section of an alternative "reflective grating" torque transducer manufactured by a method according to the either the first or a second embodiment of the present invention. Grating elements 4 and 5 are attached to or integral with torque input members 1 and 2 respectively, in turn rotationally and axially fixed to either end of torsion bar 3 via cross pins 61 and 62. Grating elements 4 and 5 comprise planar and radially disposed surfaces composed of alternating regions of high and low reflectivity, provided by grating patterns 11 and 12. This assembly is enclosed in housing 6 and supported by bearings 7 and 8. One or more electromagnetic radiation (EMR) sources 13 are disposed to illuminate the surfaces in the vicinity of array 9. Array 9, comprising one or more EMR sensitive detectors receives incident EMR from the surfaces and the images thus generated on array 9 are processed by processor 10.

Figure 6:
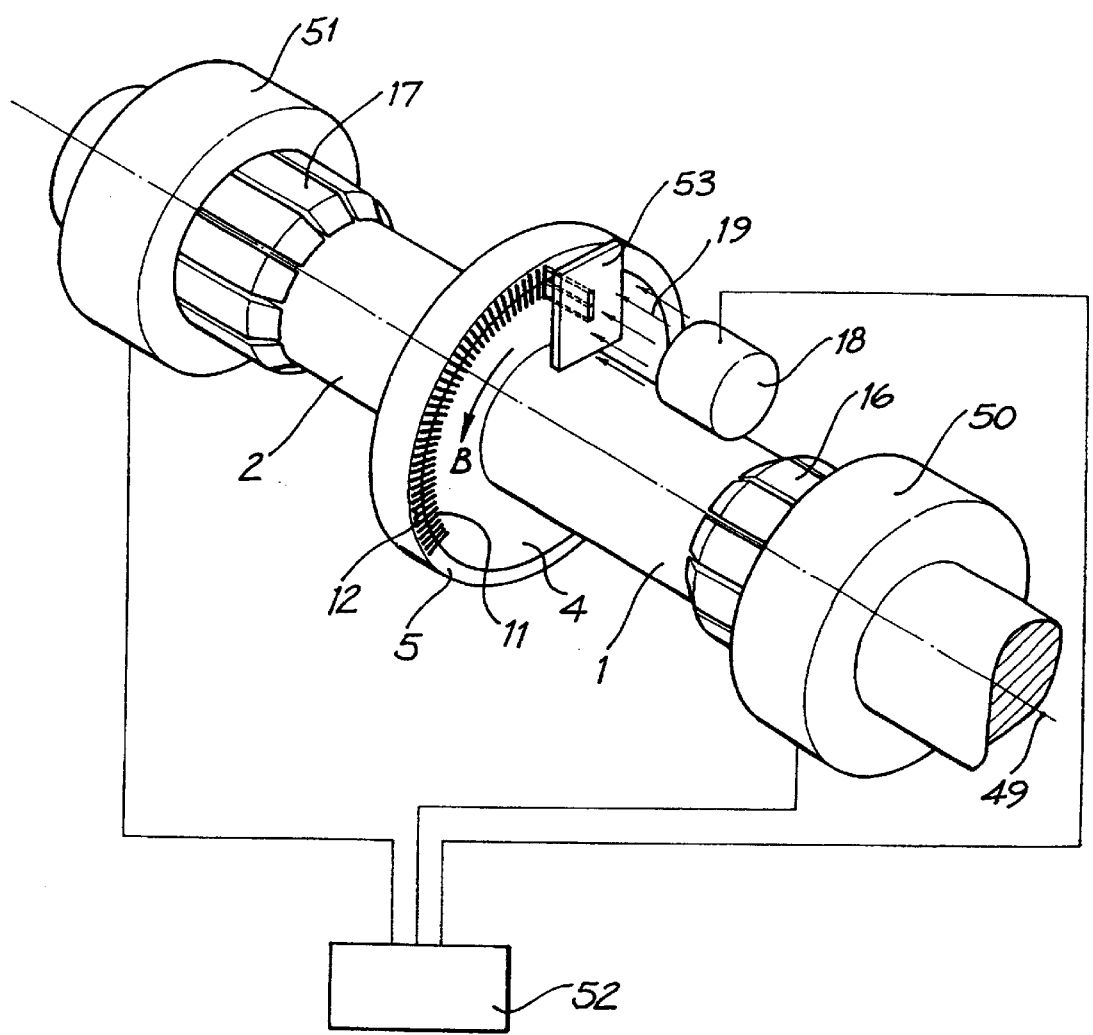
FIG. 6 is an isometric view of the shaft assembly shown in FIG. 5, being rotated about its axis with a radiation source generating grating patterns on the grating elements according to a first embodiment of the present invention.

FIG. 6 shows a method of manufacture of the shaft assembly of the torque transducer shown in FIG. 5 according to the first embodiment of the present invention, and is analogous to the method described in reference to FIGS. 2, 3 and 4. However, in this case the alignment axes of radiation source 18, irradiation 19 and mask 53 are rearranged to allow the grating patterns 11 and 12 to be applied to the planar surfaces of grating elements 4 and 5 perpendicular to the shaft axis.

Figure 7:
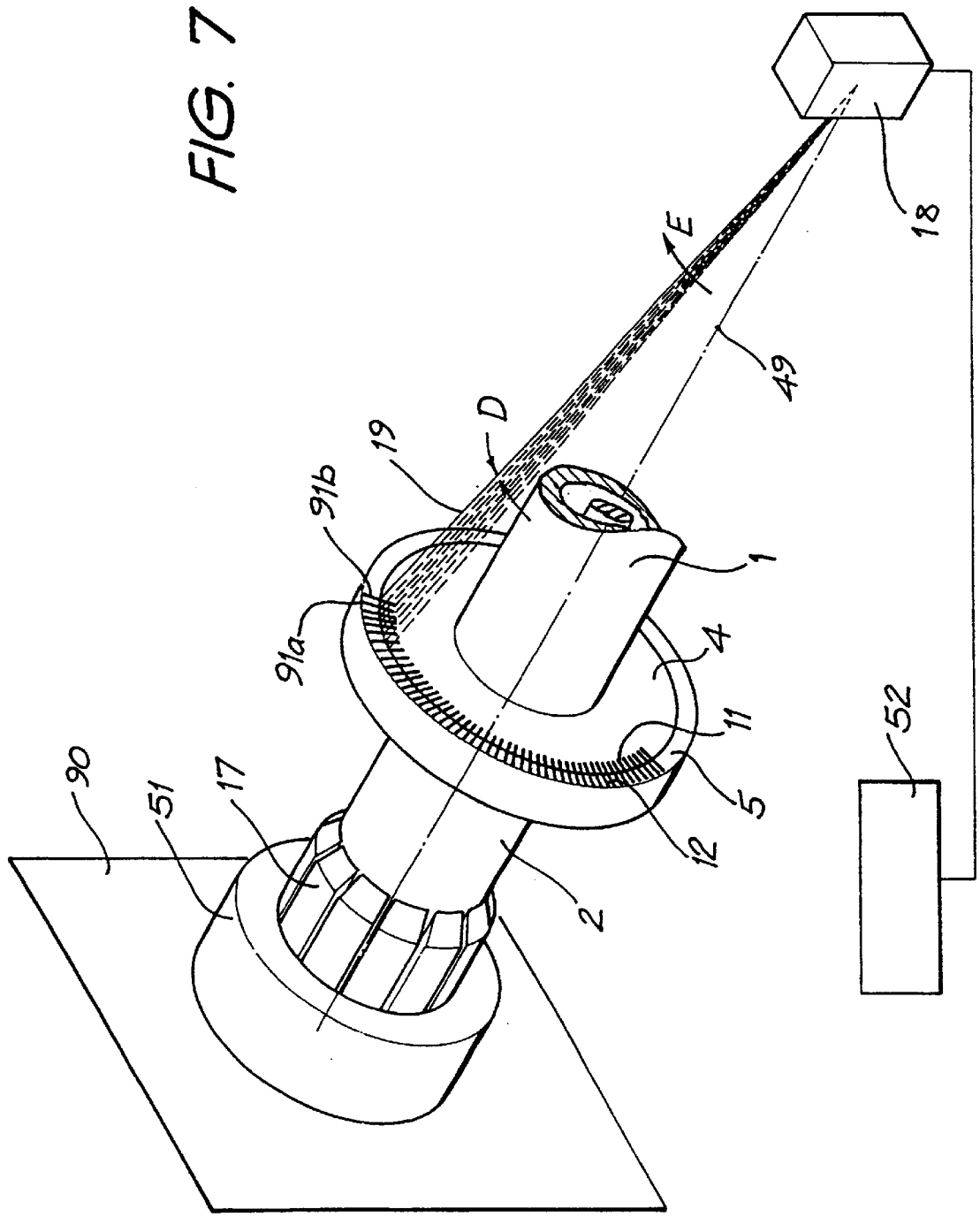
FIG. 7 is an isometric view of the shaft assembly shown in FIG. 5, with the shaft assembly stationary and a radiation source generating grating patterns on the grating elements by traversing focussed irradiation along a predetermined path according to a second embodiment of the present invention.
Figure 8:
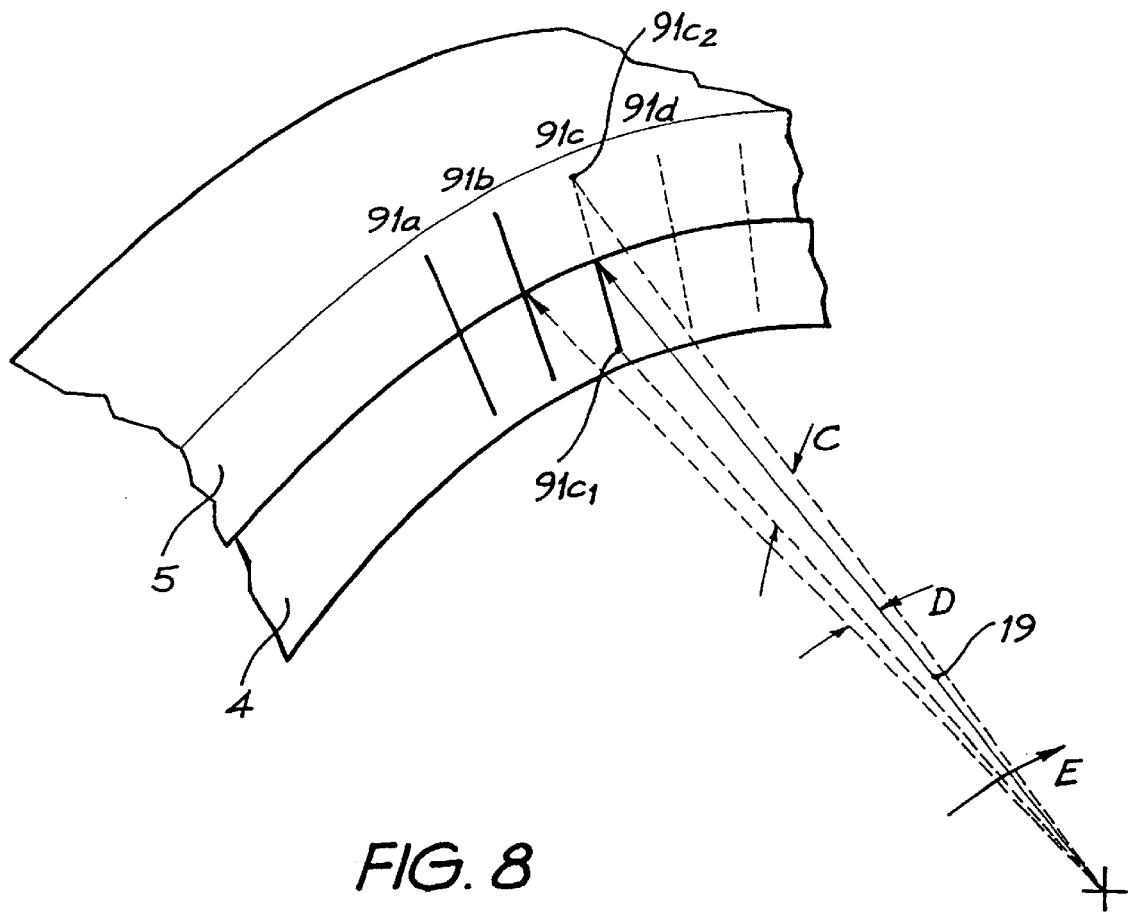
FIG. 8 is a more detailed section of the shaft assembly shown in FIG. 7, showing the path traversed by the irradiation.

FIGS. 7 and 8 show a method of manufacture of the shaft assembly of the torque transducer shown in FIG. 5 according to the second embodiment of the present invention, and are isometric views of the shaft assembly, showing planar and radially disposed grating elements 4 and 5 attached to or integral with torque input members 1 and 2, in turn rotationally and axially fixed to either end of torsion bar 3. The shaft assembly is gripped by a collet 51 that is in turn rigidly attached to the frame 51 of a machine structure (not shown), hence the shaft assembly cannot rotate about shaft axis 49. Also attached to the machine structure is radiation source 18, hence the location of the collet 51 and irradiation source 18 are accurately determined relative to the shaft assembly by the machine structure (not shown).

Irradiation source 18 provides focussed irradiation 19 to the planar surfaces of grating elements 4 and 5, thus generating grating patterns 11 and 12 comprising alternating regions of high and low reflectivity for the given EMR source (13 in FIG. 5). In this second embodiment of the present invention the regions of high reflectivity are generated sequentially, where each successive region of high reflectivity 91a, 91b, 91c, etc is generated by traversing focussed irradiation 19 directed at grating elements 4 and 5 from through arc C. At the completion of traverse C the radiation source 18 is redirected at the next region, by moving the irradiation in direction E by incremental arc D. FIG. 7 shows the case where traverse across region 91b has been completed and the irradiation has been moved by incremental arc D from region 91b to region 91c. Traverse across region 91c extends from position $91c_1$ to $91c_2$ and is shown part completed. The dashed areas of regions 91c, 91d, etc depict regions yet to be irradiated in subsequent traverses. Controller 52 provides appropriate control signals to radiation source 18 to effect traverses across 91a, 91b, 91c, 91d, etc. A suitable system which includes a controller and deflectable mirrors is "SH Series Marking Heads"

manufactured by Synrad, of Washington, USA. In the example shown regions 91a, 91b, 91c, 91d, etc. are generated by a single pass of irradiation 19 through arc C. However it is apparent that the same method can equally be applied where multiple traverses are required for each successive region, for example when the intended width of the region is larger than the width of the focussed irradiation, or where the chemical or physical changes necessary to produce the region require more energy than radiation source 18 can provide during a single traverse. It is also apparent that the same method can be equally applied by moving the radiation source 18 relative to grating elements 4 and 5, rather than the embodiment shown in FIGS. 7 and 8, where irradiation 19 is traversed through defined arcs C and D with the position of radiation source 18 being fixed with respect to the position of grating elements 4 and 5.

Figure 9:
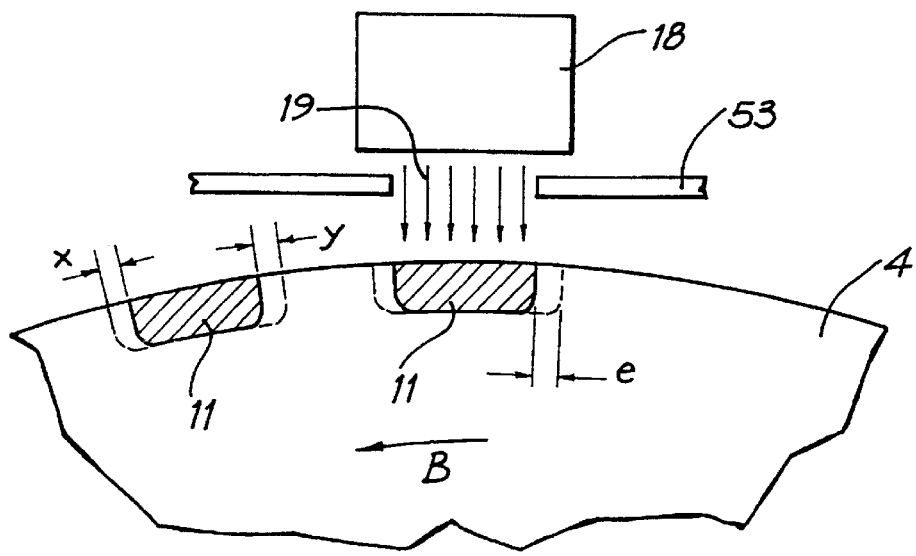
FIG. 9 shows a section of one of the grating elements on Section AA in FIG. 1, illustrating the situation where the grating patterns are generated whilst the shaft is rotating.

FIG. 9 shows generation of grating patterns according to the first embodiment of the present invention without stopping the shaft assembly for each successive irradiation. This is a view on Section AA of cylindrical grating element 4 in FIG. 1, showing the generation of the grating pattern 11 by irradiation 19 provided by radiation source 18. This irradiation 19 occurs "on the fly" whilst the grating element is rotating in direction "B" as shown. Since irradiation 19 requires a finite time "t" to generate the predetermined subpattern, the grating element moves by the distance "e" during the period of time that the irradiation is occurring, which means that areas "x" and "y" are irradiated for a shorter time than the remainder of the subpattern and the edges of the subpattern are thus made less distinct. This displacement "e" can be made sufficiently small by correct selection of shaft assembly angular velocity and irradiation time "t" such that the grating pattern 11 provides adequate accuracy for correct functioning of the torque transducer.

Figure 10:
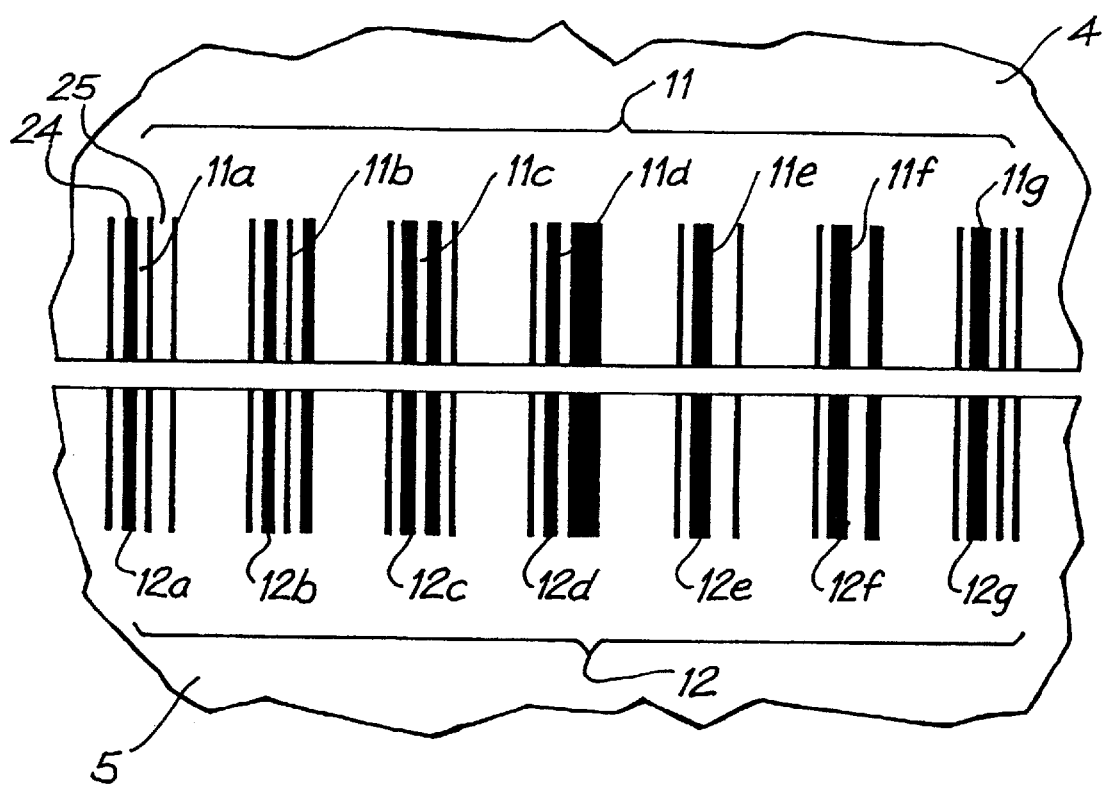
FIG. 10 is a diagrammatic view of a portion of the surfaces of the grating elements shown in FIG. 1, wherein the grating patterns are alternatively in the form of a succession of bar code subpatterns.

FIG. 10 is a diagrammatic view of a portion of the surfaces of grating elements 4 and 5 shown in FIG. 1, wherein the grating patterns are alternatively in the form of a succession of bar code subpatterns. The construction of the transducer, including the shaft assembly, is essentially the same as that shown in FIG. 1. Grating elements 4 and 5 comprise grating patterns 11 and 12 on their cylindrical peripheries respectively, wherein the individual grating subpatterns consist of barcode sequences of regions of high reflectivity 24 (shown black in the figure) and low reflectivity 25 (shown white in the figure). One or more electromagnetic radiation (EMR) sources 13 are disposed to illuminate the surfaces in the vicinity of array 9. Array 9, comprising one or more EMR sensitive detectors receives incident EMR from the surfaces and the images thus generated on array 9 are processed by processor 10. The individual barcode subpatterns are appropriately coded and arranged in a predetermined manner around the cylindrical periphery of the grating elements such that processor 10 can determine the relative angular displacement of grating patterns 11 and 12, and the absolute angular position of grating patterns 11 and 12 with respect to the array 9.

Figure 11:
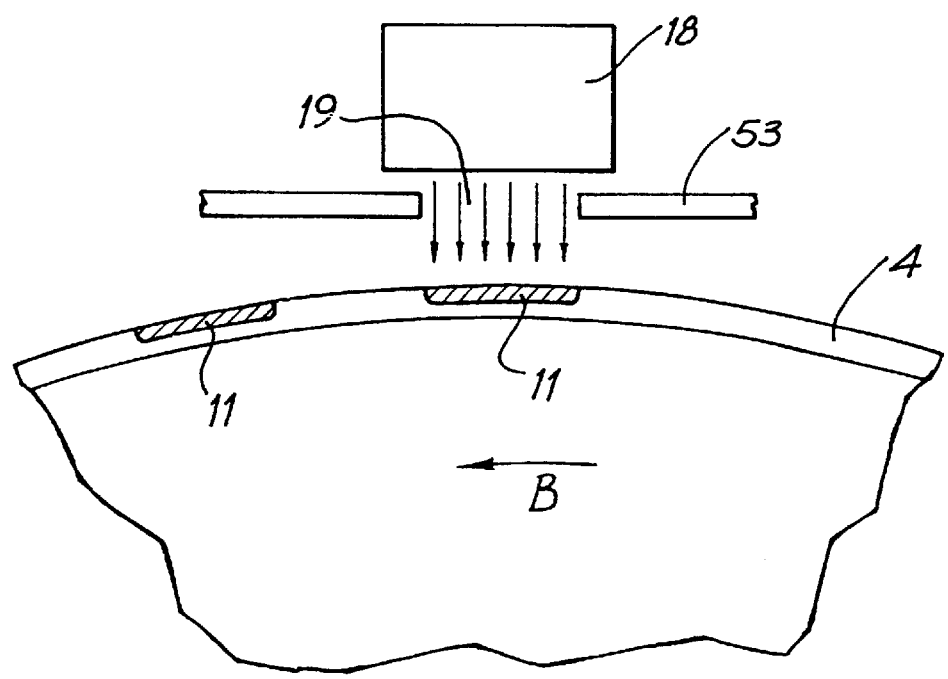
FIG. 11 shows a section of one of the grating elements on Section AA in FIG. 1 wherein grating patterns are generated by removal of material or a change in chemical or physical properties of the grating elements.

FIG. 11 is a section of the surface of grating element 4 on Section AA in FIG. 1 showing the physical effect of the irradiation 19 on the surface of the grating element during generation of the grating pattern 11. Irradiation 19 occurs repetitively whilst the grating element is rotating in direction "B" as shown, and results in material removal or changes the surface finish, physical or chemical properties of regions of the grating element 4, which increases or decreases the reflectivity of these regions, thus generating grating pattern 11. For example a grating pattern 11 may consist of regions of aluminium generated by irradiation 19 of an anodised aluminium surface of grating element, where the irradiation chemically reduces the anodised aluminium oxide material.

Figure 12:
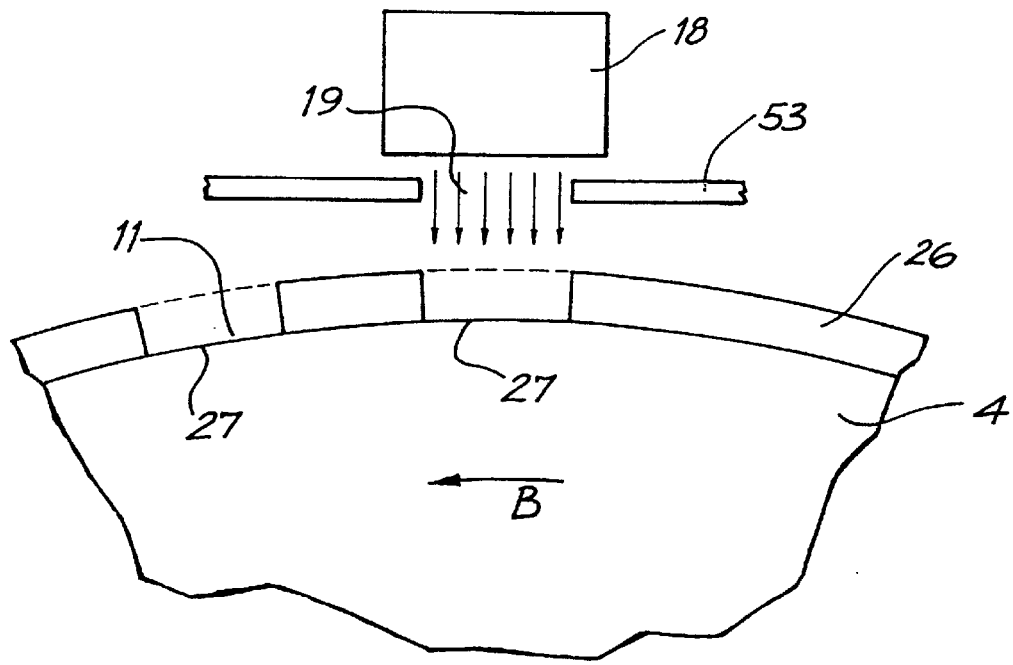
FIG. 12 shows a section of one of the grating elements on Section AA in FIG. 1 wherein grating patterns are generated by application of additional material to the grating element with subsequent irradiation removing predetermined regions.

FIG. 12 is a section of the surface of grating element 4 on Section M in FIG. 1, showing an alternative method of generating regions of high and low reflectivity to that described in FIG. 11. A layer of polymer 26 has been preapplied to the surface of grating element 4. Irradiation 19 occurs repetitively whilst the grating element is rotating in direction "B" as shown, and removes regions of layer 26 resulting in exposure of regions 27 of the original surface of grating element 4. These regions 27 are of higher or lower reflectivity compared to the surface of layer 26, thus generating grating pattern 11. An example of a suitable polymer 26 is "Eagle Resist" manufactured by Shipley Co.

Figure 13:
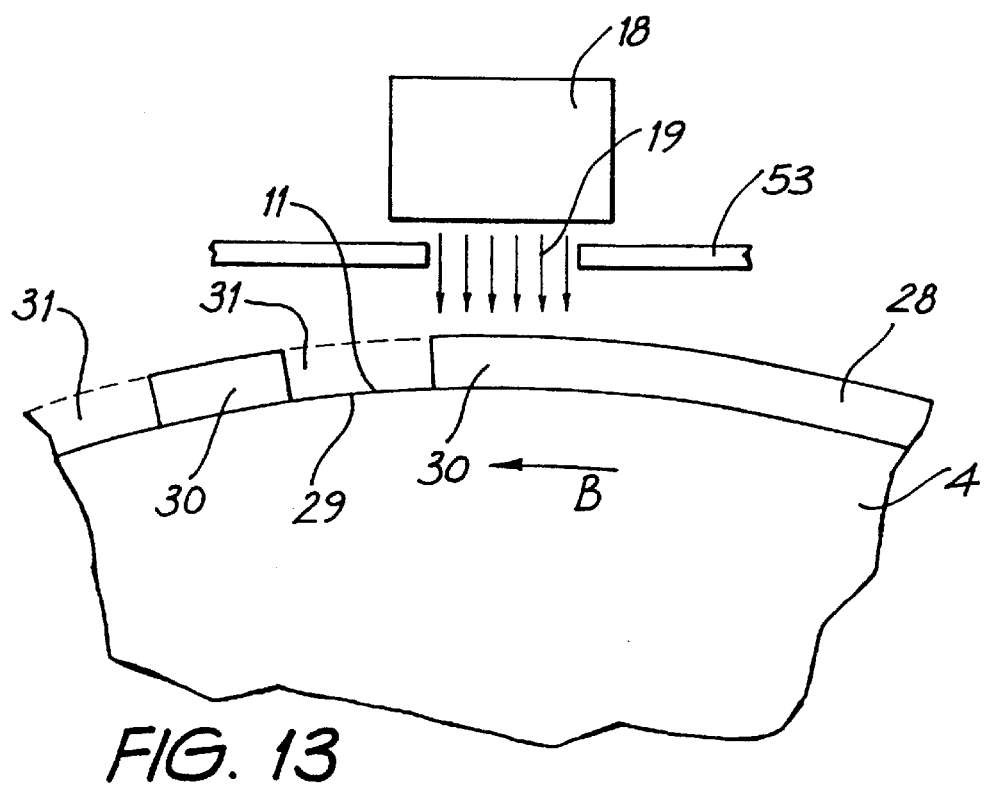
FIG. 13 shows a section of one of the grating elements on Section AA in FIG. 1 wherein grating patterns are generated by application of additional material to the grating element with irradiation curing predetermined regions, and subsequent removal of uncured material.

FIG. 13 is a section of the surface of grating element 4 on Section AA in FIG. 1, showing still another alternative method of generating regions of high and low reflectivity to that described in FIG. 11. A layer of uncured polymer 28 has been preapplied to the surface of grating element 4. Irradiation 19 occurs repetitively whilst the grating element is rotating in direction "B" as shown, which results in curing of regions 30 of layer 28. Subsequent removal of the remaining uncured polymer 31 results in exposure of regions 29 of the original surface of grating element 4. These regions 29 are of higher or lower reflectivity compared to layer 28, thus generating grating pattern 11. An example of a suitable polymer is "Flexmate" manufactured by DecoChem of Mishawaka, Ind., USA.

The first and second embodiments of the present invention are described herein with respect to a method of manufacture of a "reflective grating" torque transducer. However it is apparent that the same method can equally be applied to the manufacture of a "transmissive grating" torque transducer. Such a torque transducer similarly employs substantially cylindrical or radially disposed planar grating elements. However the portion of the respective grating element to which the grating pattern is applied is arranged to be substantially transparent to the EMR emitted by the source(s). The source(s) and array(s) are arranged in a manner such that the EMR emitted by the array(s) passes through this transparent medium and is interrupted by the grating pattern applied at or near the surface of the respective grating element. The regions of high and low transmissibility in this pattern generates an image on the respective array which receives the incident EMR. The method, according to the present invention, of manufacturing a grating pattern for such a "transmissive grating" torque transducer is identical to that described in this specification in reference to a grating pattern for a "reflective grating" torque transducer, the only difference being that in the former case the medium to which the grating pattern is applied is necessarily substantially transparent to the EMR emitted by the source (typically manufactured from glass or a transparent plastic material).

It will be appreciated by persons skilled in the art that numerous variations and/or modifications may be made to the invention as shown in the specific embodiments without departing from the spirit or the scope of the invention as broadly described. The present embodiments are, therefore, to be considered in all respects as illustrative and not restrictive.

What is claimed is:

1. A method of manufacturing grating patterns on the surfaces of grating elements of a torque transducer, the torque transducer comprising a shaft with a longitudinal axis, the shaft comprising first and second substantially rigid torque input members which are connected by a torsionally compliant coupling, the coupling thereby enabling angular deflection of the first torque input member relative to the second torque input member as a function of the magnitude of the torque in the shaft, a first grating element attached to or integral with the first torque input member and a second grating element attached to or integral with the second torque input member, the surfaces of the two grating elements being adjacent and able to relatively displace as a function of torque in the shaft, the method comprising the steps of:

a first step of forming an assembly by rotationally and axially fixing the first and second torque input members and respective grating elements to the torsionally compliant coupling;

a second step of mounting the assembly in a machine comprising a radiation source arranged to irradiate regions of the adjacent surfaces of the two grating elements whilst a predetermined relative angular displacement between the two torque input members with respect to their zero torque alignment condition is maintained; and a third step of simultaneously irradiating regions of the adjacent surfaces of the two grating elements whilst the predetermined angular displacement between the two torque input members is maintained;

thereby generating grating patterns on the surfaces of the two grating elements of the assembly which are precisely mutually aligned for this zero torque alignment condition.

2. A method as claimed in claim 1, wherein the machine provides mounting for rotation of the assembly about the longitudinal axis of the shaft and the third step further comprises rotating the assembly and successively irradiating regions of the adjacent surfaces at predetermined angular rotational positions of the assembly.

3. A method as claimed in claim 2, wherein the assembly rotates through substantially one revolution during the successive rotations.

4. A method as claimed in claim 2, wherein the assembly is rotationally stationary during at least one of the successive irradiations.

5. A method as claimed in claim 2, wherein the assembly is rotating during at least one of the successive irradiations.

6. A method as claimed in claim 1, wherein the assembly is mounted stationary in the machine during the third step.

7. A method as claimed in claim 1, wherein the surface of at least one of the first or second grating elements is substantially cylindrical, with its central axis collinear with the longitudinal axis of the shaft.

8. A method as claimed in claim 1, wherein the surface of at least one of the first or second grating elements is substantially planar and radially disposed with respect to the longitudinal axis of the shaft.

9. A method as claimed in claim 1, wherein the surface of at least one of the first and second grating elements is substantially conical, with its central axis collinear with the longitudinal axis of the shaft.

10. A method as claimed in claim 1, wherein the surface of at least one of the first and second grating elements is substantially axi-symmetric, with its central axis collinear with the longitudinal axis of the shaft.

11. A method as claimed in claim 1, wherein each grating pattern comprises alternating regions of high and low reflectivity or transmissibility for a given incident electromagnetic radiation.

12. A method as claimed in claim 1, wherein a radiation-opaque mask is interposed between the radiation source and the surfaces of the grating elements and the geometry of the mask determines the shape and s disposition of the patterns.

13. A method as claimed in claim 1, wherein the radiation source comprises a laser that irradiates the surfaces of the grating elements and the shape and disposition of the patterns are determined by controlling the laser beam focus and/or impingement position on the grating elements.

14. A method as claimed in claim 1, wherein the radiation source comprises a laser that irradiates the surfaces of the grating elements and the shape and disposition of the patterns are determined by controlling the relative positions of the grating elements and the laser.

15. A method as claimed in claim 1, wherein the predetermined relative angular displacement maintained between the two torque input members is substantially zero.

16. A method as claimed in claim 1, wherein the grating pattern on at least one of the grating elements is arranged in the form of a bar code or a succession of bar codes.

17. A method as claimed in claim 11, wherein the irradiation removes material or changes the physical or chemical properties of regions of the adjacent surfaces of the grating elements, thereby increasing or decreasing the reflectivity or transmissibility of these regions.

18. A method as claimed in claim 11, wherein a layer of polymer such as polyimide is applied to the adjacent surfaces of the grating elements prior to irradiation, and the irradiation removes this layer from regions of the grating elements, thereby exposing the original surface of the grating elements, this being of increased or decreased reflectivity or transmissibility compared to the surface of the polymer layer.

19. A method as claimed in claim 11, wherein a layer of inorganic material such as alumina ceramic is applied to the adjacent surfaces of the grating elements prior to irradiation, and the irradiation removes this layer from regions of the grating elements, thereby exposing the original surface of the grating elements, this being of increased or decreased reflectivity or transmissibility compared to the surface of the inorganic layer.

20. A method as claimed. in claim 11, wherein a layer of metallic material such as electroplated copper is applied to the adjacent surfaces of the grating elements prior to irradiation, and the irradiation removes this layer from regions of the grating elements, thereby exposing the original surface of the grating elements, this being of increased or decreased reflectivity or transmissibility compared to the surface of the metallic layer.

21. A method as claimed in claim 17, wherein the surfaces comprise a proportion of titanium dioxide and the change in chemical properties is effected by changing the titanium dioxide to titanium oxide.

22. A method as claimed in claim 17, wherein the surfaces comprise a proportion of aluminium oxide, and the change in chemical properties is effected by reduction of aluminium oxide to aluminium.

23. A method as claimed in claim 11, wherein the irradiation cures regions of a layer of uncured polymer applied to the adjacent surfaces of the grating elements prior to irradiation, the surfaces of these regions being of increased or decreased reflectivity or transmissibility compared to the original surface of the grating elements which are subsequently exposed by removal of the remaining uncured polymer after irradiation.

24. A method as claimed in claim 7, wherein the assembly is subjected to turning, grinding, roller burnishing, honing or other processes to improve the relative cylindricity or concentricity of the surface of the at least one substantially cylindrical grating element before the grating pattern is generated.

25. A method as claimed in claim 8, wherein the assembly is subjected to turning, grinding, roller burnishing, honing or other processes to improve the relative flatness or planarity of the surface of the at least one substantially planar and radially disposed grating element before the grating pattern is generated.

26. A method as claimed in claim 9, wherein the assembly is subjected to turning, grinding, roller burnishing, honing or other processes to improve the relative conicity or concentricity of the surface of the at least one substantially conical grating element before the grating pattern is generated.

* * * * *